United States Patent [19]
Hehl

[11] 3,806,294
[45] Apr. 23, 1974

[54] INJECTION MOLDING UNIT
[76] Inventor: Karl Hehl, Seidlung 183, Lossburg/Wurt, Germany
[22] Filed: Nov. 15, 1972
[21] Appl. No.: 306,724

Related U.S. Application Data
[62] Division of Ser. No. 94,431, Dec. 2, 1970, Pat. No. 3,729,280.

[30] Foreign Application Priority Data
Dec. 10, 1969 Germany............................ 19611819
Feb. 17, 1970 Germany...................... 20070386
Feb. 25, 1970 Germany..................... 20203376

[52] U.S. Cl............... 425/242 R, 259/191, 425/145
[51] Int. Cl............................................... B29f 1/04
[58] Field of Search........... 425/242, 247, 245, 159, 425/136, 149, 166; 259/191

[56] References Cited
UNITED STATES PATENTS
3,596,326  8/1971  Annis, Jr.......................... 425/242 X
3,738,618  6/1973  Hehl................................... 259/191
3,396,431  8/1968  Kovach et al..................... 425/159
3,140,332  7/1964  Brown............................... 425/149
3,001,233  9/1961  Ernst................................. 425/145

Primary Examiner—J. Spencer Overholser
Assistant Examiner—David Safran
Attorney, Agent, or Firm—Spencer & Kaye

[57] ABSTRACT

A method for producing cast pieces from a synthetic material comprises the steps of preplasticizing the synthetic material while the plasticizing cylinder is in communication with the mold cavity, relaxing the preplasticized material to remove the pressure thereon by a limited relative movement between a plasticizing cylinder and a screw conveyer, lifting the plasticizing cylinder away from the mold cavity and out of communication therewith, removing the previously cast piece from the mold cavity, and injecting the material in the plasticizing cylinder through the always open nozzle and into the mold cavity by a stroke of a screw conveyer toward the mold cavity. The apparatus for carrying out this method includes a plasticizing cylinder having a screw conveyer arranged therein. The cylinder and conveyer are mounted for movement relative to one another along the injection axis. Means including a guide member and an abutment are provided for permitting a limited relative movement between the cylinder and screw conveyer.

7 Claims, 15 Drawing Figures

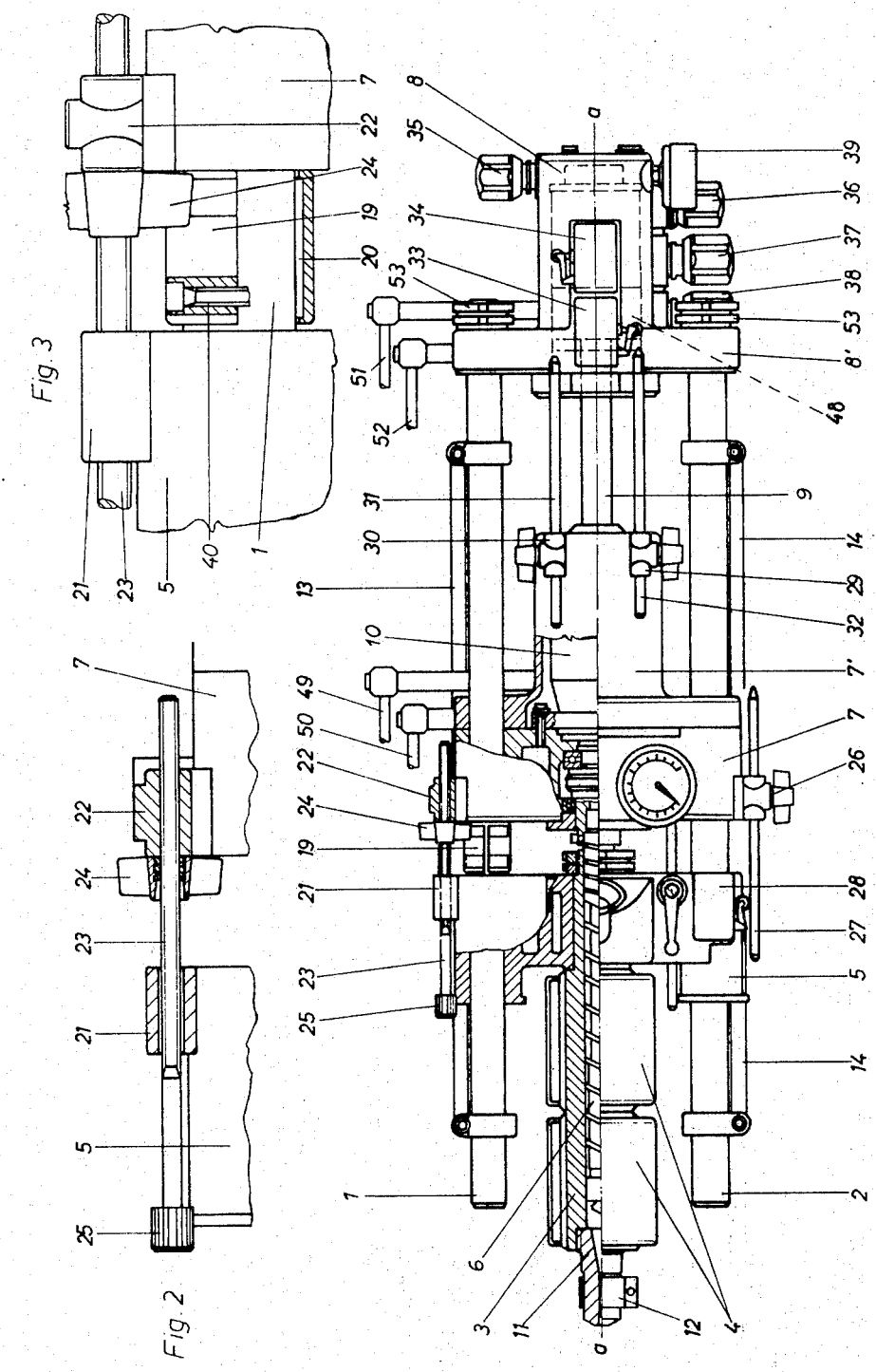

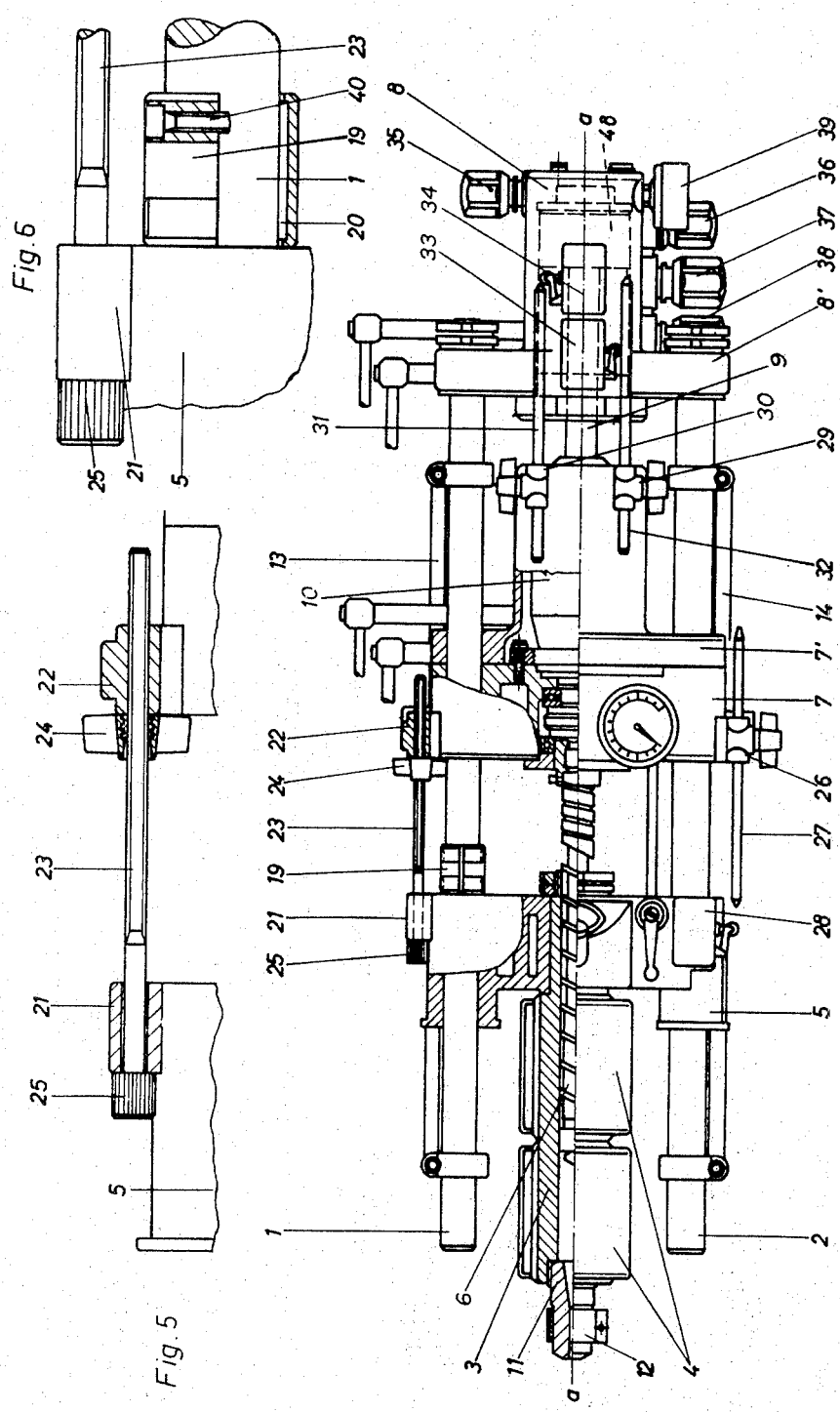

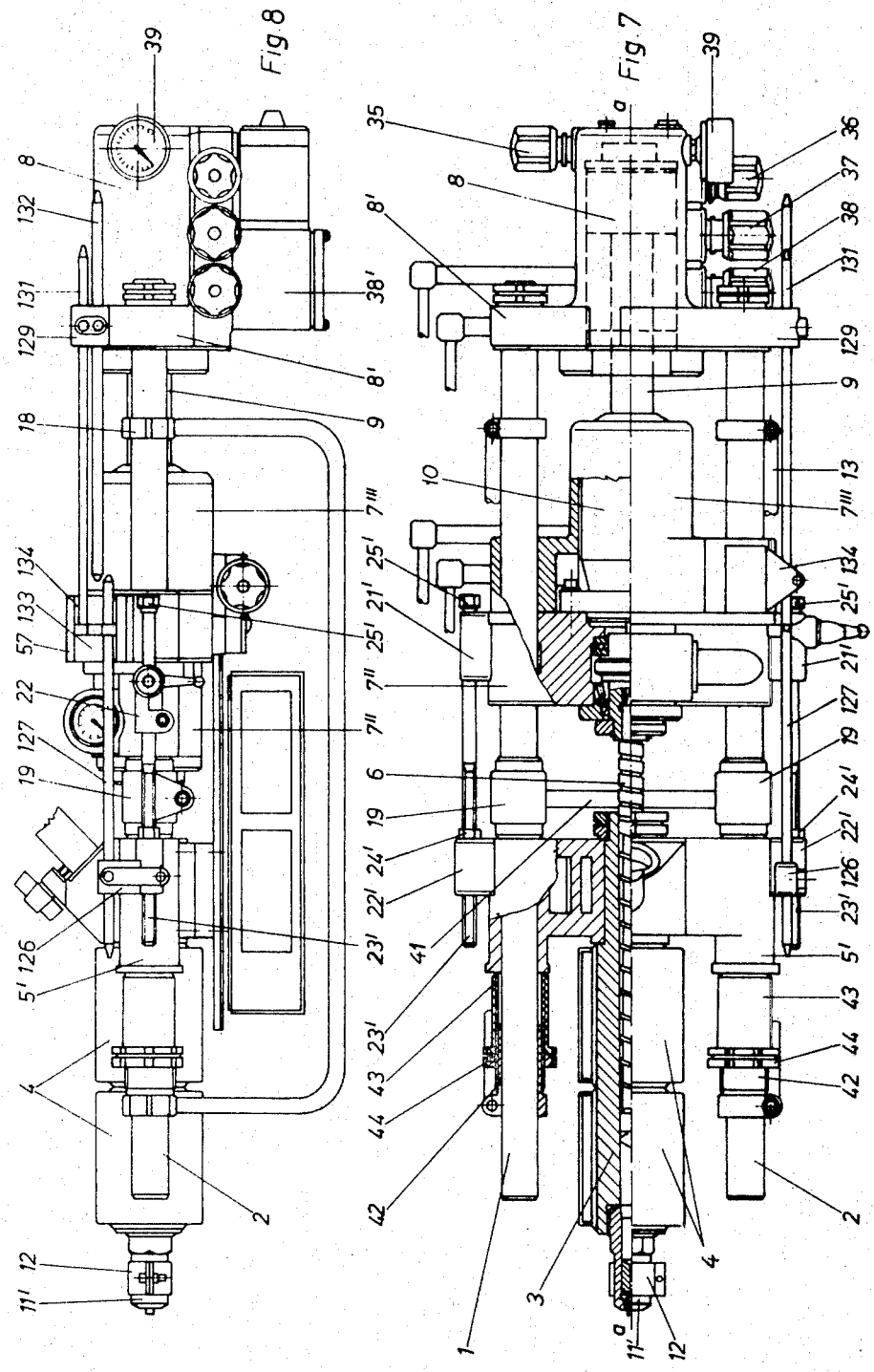

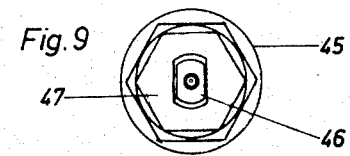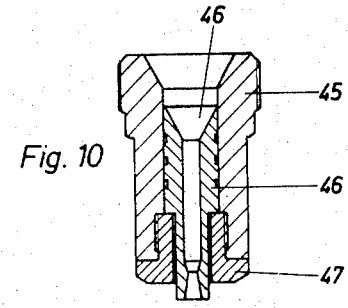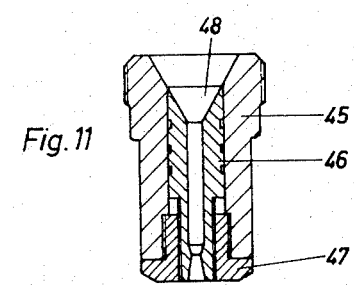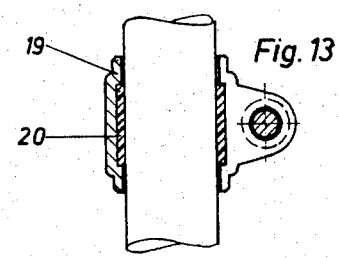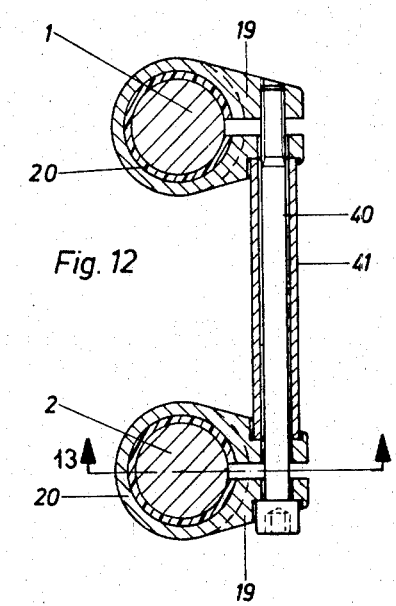

INJECTION MOLDING UNIT

CROSS REFERENCE TO RELATED APPLICATION

This application is a division of Application Ser. No. 94,431, filed Dec. 2, 1970, now U.S. Pat. 3,729,280.

BACKGROUND OF THE INVENTION

The present invention relates to a method for producing injection-molded items made from a synthetic or the like — thermoplastics, thermosetting plastics and elastomers — which is collected in a plasticizing cylinder in front of a rotating screw conveyer with a relative movement between the plasticizing cylinder and the screw conveyer and is there plasticized by a preptasticizing process. The above-mentioned relative movement is caused by the ramming pressure of the plastic synthetic. The synthetic is then injected into a mold by an axial stroke of the screw conveyer to form an article by injection molding; the cast item produced in the previous injection-molding cycle having first been ejected from the mold.

The present invention also relates to an injection-molding unit for use with this process and comprising an injection-molding cylinder which can be moved away from the casting mold and a screw conveyor which can be displaced by means of a hydraulic drive means, which conveyor preplasticizes a predetermined amount of synthetic material when the amount of material for the previous cycle has been injected into the casting mold. The ramming pressure of this preplasticized synthetic causes the conveyer to axially retract.

In a known method and injection-molding unit of this type having a lockable nozzle, the injection cylinder is lifted from the casting mold upon completion of the injection-molding step and the nozzle is then automatically locked. The required amount of synthetic material for the next injection-molding cycles is then preplasticized in the injection cylinder. See, for example German Pats. Nos. 1,168,061, 1,172,420 and U.S. Pat. No. 3,538,549, issued Nov. 10, 1970 to Karl Hehl.

Experience has shown that such an injection unit is often not suited for processing synthetic materials containing additives such as ceramic, powdered metal, asbestos and the like, added to produce certain mechanical, thermal, electrical or magnetic properties in the finished product. These additives can substantially interfere with the normal injection-molding process and might make it entirely impossible. In many cases the mixture to be processed can no longer be pressed through the passage of the lockable nozzle, or at least not at a sufficient speed. This is the case particularly when the additive is a structured kind, such as, for example, asbestos, glass fibers, and textile fibers. In the extreme case, these additives may stop up the nozzle. Similar difficulties result during processing of certain thermosetting plastics. The paste-type thermosetting plastic is excessively congested in the passageway of the lockable nozzle. It has been shown that certain thermosetting plastics in their pasty state can no longer pass through the relatively narrow nozzle opening.

SUMMARY OF THE INVENTION

It is an object of the present invention to provide a method and injection-molding unit of the above-mentioned type with which synthetic materials having extremely different properties can be processed, even when these synthetic materials contain additives such as asbestos, textile fibers, glass fibers, ceramic, powdered metal, and the like. This also applies to additives which strongly reduce the fluidity of the synthetic material to be processed.

According to the method of the present invention, this object is accomplished in that the synthetic material is preplasticized when a nozzle is open and rests on a casting mold filled with synthetic. Thereafter, with the nozzle still open, the ramming pressure in the preplasticized synthetic is released in a relaxation stroke carried out by a limited relative movement between a screw conveyer and a plasticizing cylinder, and the plasticizing cylinder is then lifted away from the injection mold with the nozzle still open.

The injection-molding unit of the above-mentioned type is distinguished, according to the present invention, in that the injection cylinder is provided with a nozzle which remains open during the entire injection-molding cycle, as well as means suitable for relieving the ramming pressure in the preplasticized synthetic by means of a limited relative movement between the plasticizing cylinder and the screw conveyer before or immediately after the plasticizing cylinder is lifted, or moved, away from the casting mold.

Advisably the injection unit is provided with a nozzle without lock.

BRIEF DESCRIPTION OF THE DRAWINGS

FIG. 1 is a top plan view, partly in cross section, of an injection unit according to a first embodiment, shown in contact with a casting mold (not shown) immediately after completion of the injection step. FIG. 2 is a cross-sectional, detail view of a portion of the injection unit according to FIG. 1 on a larger scale.

FIG. 3 is a cross-sectional detail view of portions of the detail of FIG. 2, and showing additional portions of the injection unit of FIG. 1 being on a larger scale.

FIG. 4 is a top plan view, partly in cross section, and showing the injection unit according to FIG. 1 lifted away from the casting mold, shown after completion of the preplasticizing phase.

FIG. 5 is a cross-sectional detail view showing a portion of the invention unit of FIG. 4 on a larger scale.

FIG. 6 is a cross-sectional detail view of a portion of the detail of FIG. 5, and showing additional portions on a larger scale.

FIG. 7 is a top plan view of a second embodiment of an injection unit according to the present invention, shown in contact with a casting mold (not shown) upon completion of the preplasticizing phase.

FIG. 8 is a side elevation view of the injection unit according to FIG. 7, shown after completion of the injection process.

FIG. 9 is a front elevation, detail view of a nozzle preferably used in the injection unit according to FIGS. 7 and 8.

FIG. 10 is a cross-sectional view of the nozzle according to FIG. 9, shown with its plunger in an extreme forward position.

FIG. 11 is a cross-sectional view of the nozzle according to FIG. 10, with its plunger in an extreme rearward position.

FIG. 12 is a cross-sectional view through the friction elements of the injection unit along with their associated supporting struts and clamping device.

FIG. 13 is a cross-sectional view taken generally along the line 13–13 of FIG. 12.

DESCRIPTION OF THE PREFERRED EMBODIMENTS

Figure 14:
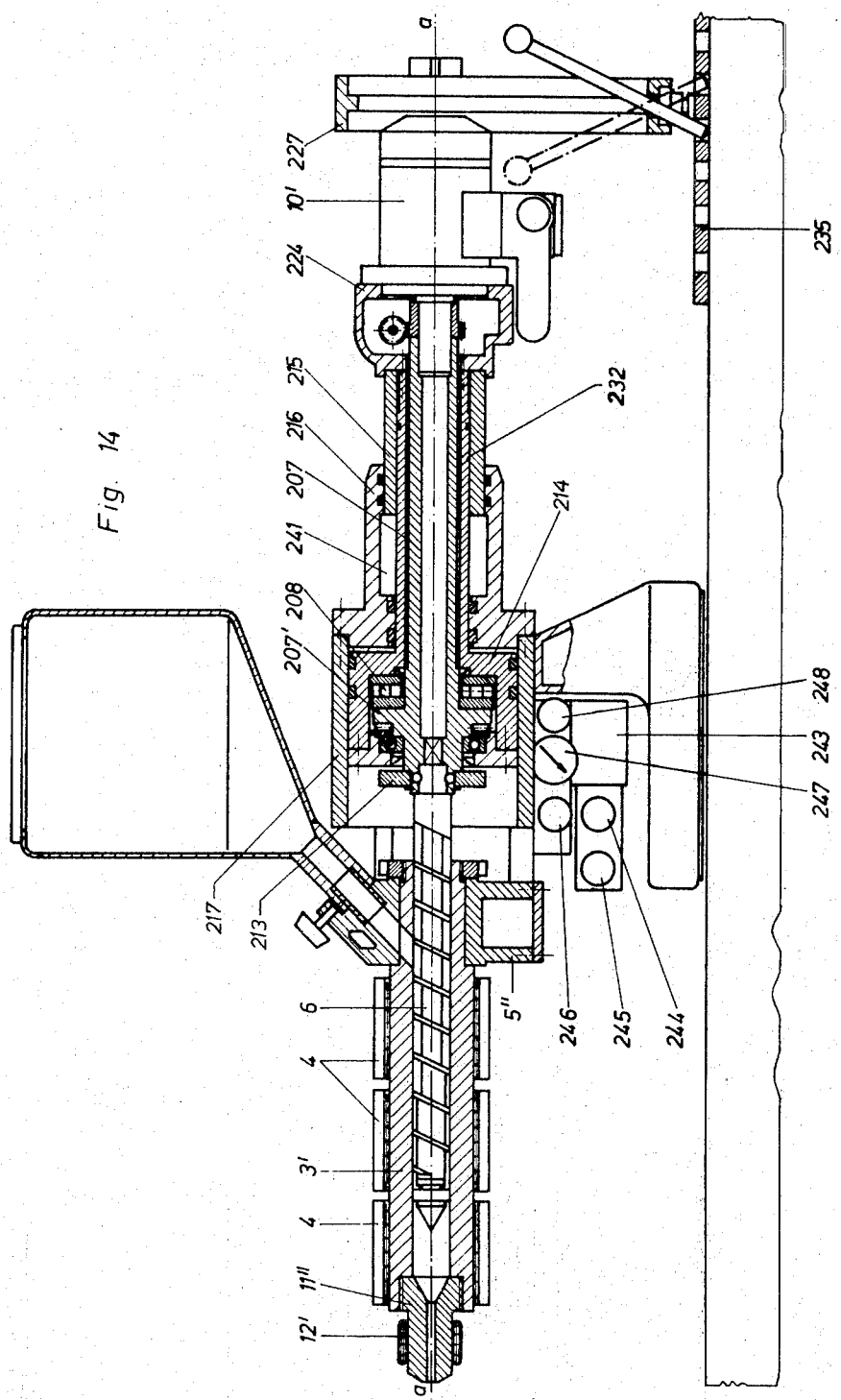
FIG. 14 is a side elevational, cross-sectional view of a third embodiment of an injection unit according to the present invention.

In the embodiments according to FIGS. 1–6 and FIGS. 7–13, respectively, the injection unit is mounted on supporting struts 1, 2. The injection, or plasticizing, cylinder 3, which can be heated by means of heating jackets 4, is mounted to be displaceable along the injection axis a—a on the struts 1, 2 with the aid of a supporting bridge 5. A rotatable screw conveyer 6 is held by a drive bridge 7, which itself is also slidable on the struts 1, 2. A hydraulic cylinder 8, which is provided with a flange 8' is mounted in a known manner — such as by nuts 53 — on the rear end of the struts 1, 2. It encloses a piston 48 which can be charged from both sides in a known manner by conduits 51, 52 and which is connected with the screw conveyer 6 through a piston rod 9 and the drive bridge 7. The rotary drive means for the screw conveyer 6 is a suitable, known fluid motor 10, preferably hydraulic, mounted on the drive bridge 7. A fluid medium is supplied to motor 10 through conduits 49, 50. Nozzle 11 of the injection cylinder 3 has a heating jacket 12 and is always open. Nozzle 11 is provided with a relatively wide passage opening such as, for example with a diameter of 3 – 4 millimeters. At least one of the struts 1, 2 has clamped to it a stationary abutment in the form of a split friction element 19 held by a clamping screw 40 (see FIGS. 12 and 13). Each element 19 is axially displaceable with adjustable friction on its associated strut 1, 2. The friction element 19 is provided in its interior with a split sleeve 20 constructed from a suitable known synthetic material (FIGS. 3, 6; 12, 13), for example, from polyamid.

In the embodiment according to FIGS. 1–6 the supporting bridge 5 and the drive bridge 7 are provided with guide members in the form of extensions 21 and 22, respectively, each of which form an eye. A rod 23 is axially adjustably fastened by a lock nut 24 in extension 22 of the drive bridge 7. The rod 23 passes through the coaxial extension 21 of the supporting bridge 5. An abutment 25 is provided on the free end of rod 23. Elements 21–25 form a limited relative movement coupling.

Eye forming extensions 29, 30 are disposed on a respective side of a hood 7' mounted on the drive bridge 7 so as to cover the fluid motor 10. Switching rods 31 and 32 are axially displaceably held in a respective one of these extensions 29, 30. The switching rod 32 operates together with a suitable, known microswitch 33 mounted on the stationary hydraulic cylinder 8 to control a second pressure stage during the injection process. The switching rod 31 cooperates with a suitable known microswitch 34 which is also fastened to the stationary hydraulic cylinder 8 to limit the return stroke of the screw conveyer 6. A switching rod 27 is axially adjustably attached to the bridge 7 by means of an extension 26 and arranged to cooperate with a known microswitch 28 mounted on the bridge 5.

The speed of the forward stroke of the motor 10 can be controlled with the aid of a choke 36, thus controlling the injection speed. Choke 36 is of a type well known in the art.

The pressure regulators 37, 38, which may be throttling valves, serve to set the first and second pressure stages during the injection process. The respective injection pressure during the first and second pressure stages, as well as the respective ramming pressure during preplasticization, can be read from a suitable, known manometer 39.

The injection unit according to the embodiment illustrated in FIGS. 1–6 operates as follows:

The operating position shown in FIG. 1 corresponds to the completion of the injection step of the molding cycle. Nozzle 11 is in contact with a suitable, known casting mold (not shown), which is already filled with a suitable, known synthetic material which is cooling. The motor 10 is started up in dependence on the expired injection time; that is, the time elapsed since the previous injection. The screw conveyer 6 is then caused to rotate. The conveyed, plasticized material is collected in front of the front end of the conveyer 6 and moves conveyer 6 backward more and more due to the ramming pressure of the accumulated synthetic. The injection cylinder 3 is being supported against the casting mold and can not move toward the mold. The resistance to which the screw conveyer 6 is subjected during its backward movement is predetermined by means of a suitable, known choke 35 which brakes the flow of hydraulic fluid from the rear cylinder chamber of cylinder 8. With the backward movement of the screw conveyer 6, the distance between the abutment 25 of the rod 23 and the extension 21 of the supporting bridge 5 continuously decreases. As soon as the switching rod 27 releases the switching roller of the microswitch 28, the motor 10 shuts down so that screw conveyer 6 stops rotating and the preplasticizing step is completed. At this moment, abutment 25 of rod 23 is disposed at a slight distance from extension 21 of the supporting bridge 5. This distance corresponds to the distance of the friction element 19 from the supporting bridge 5. The same switching pulse which stops the motor 10 for the rotary drive of the screw conveyer 6 also initiates the return stroke of the piston 48 of hydraulic cylinder 8. The piston 48 begins to pull the now non-rotating screw conveyer 6, along with its drive bridge 7, in a rearward direction, while the injection cylinder 3 remains stationary. The relative movement between the screw conveyer 6 and the injection cylinder 3 relieves the ramming pressure to which the plasticized material is subjected to by the screw conveyer 6 during the plasticizing phase, or even subjects it to a slight subatmospheric pressure. In the course of the above-mentioned relative movement between the screw conveyer 6 and the injection cylinder 3, abutment 25 finally comes in contact with the extension 21 of supporting bridge 5 to carry along the supporting bridge 5 together with the injection cylinder 3. In the first instant of this carrying along, the open, lock-less nozzle 11 is lifted away from the casting mold without the preplasticized material being able to flow out of the nozzle, because of its having been relaxed — or even put under — a slight subatmospheric pressure. In FIGS. 4–6 of the drawings, the injection unit is shown at a moment of the injection-molding cycle in which the cylinder 3 has been lifted off the casting mold upon completion of the preplasticizing phase.

The described operational process presupposes that a synthetic material is processed which permits a relative movement between the screw conveyer 6 and the plasticizing cylinder 3 when the screw conveyer 6 performs its return stroke; that is, that with the backward movement of the screw conveyer 6, the plasticizing cylinder 3 is able to stand still for at least a moment. This prerequisite is present, however, only in a relatively few cases. Usually, the weight of the plasticizing cylinder 3, or the inertia of its mass together with the frictional forces of its guide bearings which counteract an axial movement, is insufficient to overcome a wedging or sticking of the injection cylinder 3 to the screw conveyer 6. This wedging or sticking acts as a clutch between the screw conveyer 6 and the plsticizing cylinder 3. With this prerequisite of wedging or sticking in the above sense, the cylinder 3 is directly carried along when the screw conveyer 6 moves backward; that is, the plasticizing cylinder 3 is lifted away from the casting mold in the first instant of the rearward movement of the screw conveyer 6, so that the thermal contact between the injection cylinder 3 and casting mold is interrupted. Almost at the same moment, say a fraction of a second later, the supporting bridge 5 of the plasticizing cylinder 3 comes in contact with the stationary friction element 19 which is axially so adjusted that it is disposed only a slight distance — approximately 1-2mm — from the rear of the supporting bridge 5 of the plsticizing cylinder 3 when cylinder 3 is in contact with the casting mold. The abutting of the supporting bridge 5 against the friction element 19 stops the rearward movement of the plasticizing cylinder 3. In the further course of the return movement of the screw conveyer 6 the latter moves relative to the injection cylinder 3 and overcomes the wedging or sticking to the plasticizing cylinder 3 caused by a plastic synthetic granulate or by a synthetic material. With this relative movement, or relaxation stroke, the preplasticized synthetic material disposed in front of the screw conveyer 6, and which is intended for the subsequent injection cycle, is freed from its ramming pressure and/or is even subjected to a slight subatmospheric pressure. Since this relaxation of the plasticized material, or the provision of a subatmospheric pressure is produced either almost simultaneously with or directly after lifting the injection cylinder 3 away from the casting mold, the preplasticized mass can no longer pass out of the open nozzle 11 due to its lack of inertia.

The length of the relaxation stroke, which is generally only a few millimeters, depends on the quantity of the preplasticized material. The relaxation stroke is completed as soon as abutment 25 comes in contact with extension 21. With the contact of the abutment 25, the return stroke of the screw conveyer 6 is generally also terminated in dependence on its position by switching arrangement 33, 34. In some cases, however, a further return stroke may be advisable to remove the injection cylinder 3 further away from the casting mold. In this case the friction element 19 is axially displaced on its associated strut by the pushing action of the supporting bridge while overcoming the set frictional forces.

The injection process is now initiated, for example, in dependence on the ejection of the previously fabricated molded piece. For this purpose, the piston of cylinder 8 is charged from the rear. It moves the screw conveyer 6 axially in the direction toward the mold. Due to wedging or sticking of the screw conveyer 6 to the plasticizing cylinder 3, the latter is carried along and set onto the casting mold. Now, in the course of further forward movement of the screw conveyer 6, the above-mentioned wedging or sticking is overcome and the injection process begins in a first pressure stage. As soon as switching rod 32 has left the switching element of microswitch 33, the second pressure stage is initiated. This happens generally only when the mold is almost or completely filled. If the friction element 19 has been displaced during the return stroke of the screw conveyer 6, it is now brought back to its starting position (FIG. 1) when the screw conveyor 6 moves forward again. Upon completion of the injection process; the machine is in the operating position shown in FIGS. 1-3; that is, abutment 25 is again at its maximum distance from extension 21 of supporting bridge 5. In this operating position a small residual amount of preplasticized material still remains as a synthetic cushion in the plasticizing cylinder 3 to assure that the screw conveyer can exert pressure — via the synthetic cushion — on the synthetic material in the mold. The friction element 19 is disposed at a slight distance from the supporting bridge 5 corresponding to the volume of the synthetic cushion.

Continuous contact of the nozzle 11 with the casting mold is not permissible, because the thermal contact would produce a temperature equalization between the injection cylinder 3 and the casting mold which would extend the cooling time for the mold as well as cause undesirable cooling of the nozzle 11.

In the embodiment of FIGS. 7-13 a nozzle 11' has a sleeve-type nozzle element 45 (FIGS. 9-11) with an abutment element 47 in threaded engagement with nozzle element 45. This abutment element 47 limits, by means of an annular shoulder, the axial movement of a plunger 46 arranged in element 45. The plunger 46 passes through the abutment element 47 and protrudes thereabove. The area of plunger 46 which is to be charged with a synthetic material is smaller than the area of the cross section of the screw conveyer 6 producing the effective injection pressure.

The pair of friction elements 19 with their synthetic liners 20 are again clamped to their respective struts 1, 2. A clamping device is provided for this purpose which consists of a clamping screw 40 and a clamping sleeve 41 (FIGS. 12, 13). When screw 40 is tightened, both friction elements 19 are simultaneously uniformly clamped to the supporting struts 1, 2.

Rods 23' are axially adjustably clamped in extensions 22' of the supporting bridge 5' by means of check nuts 24'. The rods 23' pass through the coaxial extensions 21' of drive bridge 7". An abutment 25' is attached at the free, or unclamped, end of each rod 23'. the relative movement device comprising components 21'-25' is, in the embodiment of FIGS. 7-13, symmetrically disposed on both sides of the plasticization cylinder 3.

An axially adjustable switching rod 127 is clamped in a further eye-forming extension 126 of supporting bridge 5', and is arranged to cooperate with a suitable, known microswitch 134 disposed on the protective hood 7''' of drive bridge 7". This switching arrangement terminates the preplasticizing phase and aids in determining the quantity of synthetic material required for the injection-molding. An eye-forming protrusion 129 with axially adjustable switching rods 131, 132 is disposed at the flange 8' of hydraulic cylinder 8. Switching rod 132 cooperates with a suitable, known microswitch 133 which is disposed on the hood 7'' of drive bridge 7''. The switching arrangement 132, 133 serves to control a second pressure stage in the cycle of the injection-molding process. Switching arrangement 131, 134 serves to limit the return stroke of the screw conveyer 6 to its predetermined length. All the microswitches for a path-dependent control of the preplasticization, for the back pressure stage of the injection process, and for the return stroke of the screw conveyer 6 are accommodated in a common housing 57. The pressure regulator, or choke, 35, choke 36, pressure regulators 37, 38 and pressure gauge, or manometer, 39 serve the same purpose and have the same significance as in the embodiment of FIGS. 1–6.

Abutments 42–44, which can be fixedly clamped on struts 1, 2, limit the forward movement of the plasticizing cylinder 3. They consist of an inner clamping sleeve 42 with external threads and an abutment sleeve 43 with an internal thread which engages with the external thread of the clamping sleeve 42. The abutment sleeves are arrested by means of check nuts 44.

The operation of the injection unit according to FIGS. 7–13 — which is, as set out above, provided with two relative movement couplings disposed symmetrically to the injection axis and with two friction elements 19 — principally corresponds to the operation described above of the injection unit according to FIGS. 1–6. The embodiment of FIGS. 1–6 is provided with only one relative movement coupling and with only one friction element 19. The significant difference is the construction and operation of nozzle 11'.

In the operating position according to FIG. 7 the supporting bridge 5' of the plasticizing cylinder 3 is in contact with the abutments 42–44; this contact being under the influence of the hydraulic cylinder 8 acting through the screw conveyer 6. These abutments are axially so adjusted on the struts 1, 2 that only plunger 46 — which protrudes beyond abutment element 47 — is in contact with the casting mold. Plunger 46 is disposed, for an average operating temperature of the injection cylinder, in a center position between its possible extreme axial end positions (center position between the positions according to FIGS. 10 and 11). The substantial portion of the load which is axially applied to the injection cylinder 3 by the hydraulic cylinder 8 in the course of the injection stroke of the screw conveyer 6, and via the screw conveyer 6, is thus absorbed by abutments 42–44 without either the casting mold or the nozzle 11' being excessively stressed. The pressure which plunger 46 applies to the material entering the casting mold is determined by the cross-sectional area of its inlet, which is charged by the synthetic material in cylinder 3. This surface is, as set out above, smaller than the area of the cross section of screw conveyer 6, which produces the effective injection pressure. The contact pressure of the plunger 46 is insufficient to prevent backup from the casting mold of the still plastic material and is, on the other hand, sufficiently small to prevent any excess stress on the casting mold in the area of the injection contact.

With the aid of abutments 42–44, it is possible, even when a thick nozzle without a plunger — as shown in the embodiment according to FIGS. 1–6 — is employed, to prevent undesirably strong stresses on the casting mold — particularly in the area of the injection intake — when the axial adjustment of the abutments 42–44 on struts 1, 2 is made with care. Such an axial adjustment of the abutments can be achieved when the injection cylinder 3 and the nozzle 11 are permitted to contact the casting mold with a pressure which is still within permissible limits for stressing the casting mold. The abutments 42–44 are then brought in contact with the supporting bridge 5' and are clamped tight in the struts 1, 2. In this way it is assured that even with substantially higher injection pressures, that portion of the axial pressure of the plasticizing cylinder 3 which would result in excess stresses on the casting mold is absorbed by abutments 42–44.

Figure 15:
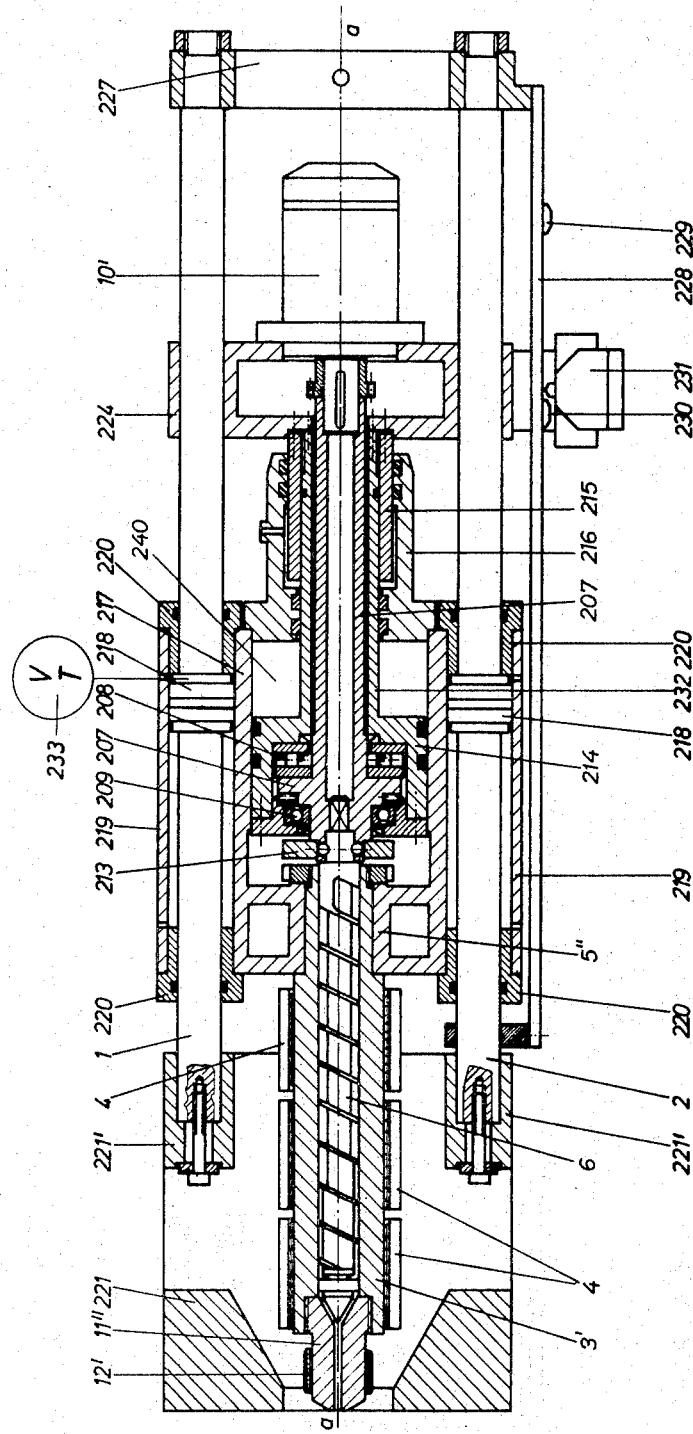
FIG. 15 is a partly schematic, top plan, cross-sectional view of the injection unit according to FIG. 14.

In the embodiment of FIGS. 14 and 15 of the drawings, the device for removing the ramming pressure has a single hydraulic drive cylinder 215, 216 which is supported by the supporting bridge 5''. As can be seen in FIG. 15, the two supporting struts 1, 2 of the injection unit are held in connecting sleeves 221' of a stationary clamping plate 221 of an injection-molding machine. The axial displacement of the plasticizing cylinder 3' — together with its supporting bridge 5'' — is performed by two hydraulic pistons and cylinders 218, 219, respectively, which are disposed symmetrically with respect to the injection axis. These cylinders each consist of a hollow piston 218 firmly seated on the associated supporting strut 1, 2, a sleeve-shaped part 219 of the supporting bridge 5'' which forms the cylinder by enclosing the piston 218, and a guide cover 220 for the struts 1, 2 of the injection unit. The cylinder chambers disposed in front and behind the pistons 218 can be charged with a suitable, known pressure medium.

The motor 10' for rotating the screw conveyer 6 is held by a supporting bridge 224 which is also disposed to be axially displaceable on the struts. The injection cylinder 3 is provided with an open nozzle 11'' which can be heated by means of heating jacekt 12.

The supporting bridge 5'' for the plasticizing cylinder 3' is shaped at its rear side to form a hydraulic cylinder 216. A piston 215 is mounted in the hydraulic cylinder 216. The hydraulic drive piston and cylinder 215, 216, which is disposed coaxially with the injection axis, serves only for removing the excess pressure in the preplasticized material accumulated in front of the screw conveyer 6, so that this material will not flow out of the open nozzle after the nozzle 11'' has been lifted away from the casting mold. Under certain conditions it may be advisable to produce even a slight subatmospheric pressure in the injection cylinder 3'. Piston rod 207 of piston 215 of the hydraulic piston and cylinder 215, 216 is indirectly connected with the screw conveyer 6 via a known releasable, axial coupling 213. The drive shaft 207 passes through piston 215 and its hollow piston rod 232 and connects the motor 10' with the screw conveyer 6. The drive shaft 207 is mounted in a known radial ball bearing 209. Piston 215 is, moreover, rigidly connected with piston 214 of a further hydraulic piston and cylinder 214, 217, respectively, which is disposed in the supporting bridge 5'' of the plasticizing cylinder 3'. This hydraulic piston and cylinder 214, 217 serves exclusively for the injection of a plastic material into the casting mold and will thus be called the injection cylinder hereinafter. The cup-type free end of the hollow piston rod 232 of piston 214 thus forms the piston of the injection cylinder 214, 217. Piston 214 of the injection cylinder 214, 217 is connected with the screw conveyer 6 via the hollow drive spindle 207 which is provided with a radial supporting flange 207'. The hollow piston rod 232 encloses the rotatable drive shaft 207 with play. The actual cylinder 217 of the hydraulic injection cylinder 214, 217 is a component of the supporting bridge 5''. In the hydraulic line to the injection cylinder 214, 217, a throttle valve 233 is installed which determines the ramming pressure in the preplasticizing phase.

A suitable, known switching valve 243, — which is a control device for the injection pressure — a suitable, known regulator 244 for the injection pressure, a suitable, known regulator 245 for the back pressure after a completed injection, and a suitable, known regulator 246 for the injection speed — as well as a suitable, known pressure gauge 247 and a suitable, known regulator 248 for the ramming pressure — are fastened to the bottom of the supporting bridge 5''.

The regulator devices 243, 248 are known pressure regulator valves, pressure adjusting valves and throttle valves.

A switching bar 228 (FIG. 15) is fastened in a known manner to a frame member 227 and is provided with axially adjustable cams 229, 230. These cams 229, 230 cooperate with the switching member of a suitable, known microswitch 231 which is fastened to the supporting bridge 224 for drive motor 10'. It is possible with the described switching arrangement to terminate the preplasticizing phase at the proper, predetermined, time by the switching member of microswitch 231 contacting cam 229. The injection stroke is terminated when the switching member of microswitch 231 abuts on cam 230.

The injection unit of FIGS. 14 and 15 operates as follows:

In the operating position according to FIG. 14 the preplasticizing phase has just been completed. A quantity of plastic material sufficient for the next cast piece is accumulated under pressure in front of the screw conveyer 6. The switching member of microswitch 231 has abutted on switching cam 229 so that the drive motor 10' for the rotation of the worm conveyer has been stopped. Now the cylinder chamber 241 of hydraulic cylinder 215, 216 is charged with a suitable, known fluid medium under pressure so that piston 215 is charged. This piston 215 generally performs a relaxation stroke of short length, approximately 1–15 mm, so that the screw conveyer 6 is pulled in a rearward direction — that is, to the right in FIG. 14. Since the plasticizing cylinder 3' is axially fixed, the return stroke of piston 215 produces a relative movement between screw conveyer 6 and the plasticizing cylinder 3' which effects a relaxation of the preplasticized material or even subjects it to a slight subatmospheric pressure. Then the rearward chambers of hydraulic piston and cylinders 218, 219, 220 are charged with a medium under pressure and the injection unit is lifted away from the casting mold without any plastic material escaping through the open nozzle 11'', 12'. Before the onset of the injection stroke, the plasticizing cylinder 3' is again placed on the casting mold with the aid of hydraulic piston and cylinders 218–220. The injection stroke is initiated by charging pressure chamber 240 of hydraulic cylinder 214, 217 with a medium under pressure. The injection stroke is terminated when the switching member of microswitch 231 abuts on cam 230 of switching bar 228.

For example polyamid with glass fiber is processed with the following operating parameters: Temperature = 280° – 300° C; injection pressure = 1,136 psig (pounds square inch gauge); back pressure after a completed injection = 710 psig; ramming pressure of plasticized material which is collected in front of the front end of the conveyer = 213 psig.

It will be understood that the above description of the present invention is susceptible to various modifications, changes and adaptations, and the same are intended to be comprehended within the meaning and range of equivalents of the appended claims.

I claim:
1. An injection unit comprising, in combination:
   a. cylinder means
   b. means mounting said cylinder means for movement along an injection axis for injecting a predetermined quantity of a synthetic material into a mold cavity defined by a mold;
   c. screw conveyer means arranged in said cylinder means for preplasticizing a predetermined quantity of synthetic material;
   d. drive means for rotating said screw conveyer means;
   e. means mounting said screw conveyer means for movement along the injection axis relative to said cylinder means under the effect of the ramming pressure of the material
   f. first hydraulic means for effecting an injection of the preplasticized material into the mold; and
   g. second hydraulic means for moving said screw conveyer means and said cylinder means as a unit, said first and second hydraulic means, and said means for mounting said cylinder means forming an integral structural unit.

2. An injection unit as defined in claim 1 further comprising a pressure bearing and a drive spindle having a radial supporting flange, wherein said first hydraulic means includes an injection cylinder which is connected with said screw conveyer means via said pressure bearing and through said radial supporting flange to said drive spindle.

3. An injection unit as defined in claim 2 further comprising an axial locking device, wherein said screw conveyer is connected with said drive spindle via said axial locking device.

4. An injection unit as defined in claim 2 further comprising a hydraulic line leading to said injection cylinder and a throttle valve in said hydraulic line for determining the accumulated pressure in the preplasticizing phase.

5. An injection unit as defined in claim 1, wherein said means mounting said cylinder means includes a supporting bridge to which said cylinder means is attached; said first hydraulic means includes an injection cylinder constituted by a part of said supporting bridge; and said second hydraulic means includes at least two drive cylinders constituted by parts of said supporting bridge.

6. An injection unit as defined in claim 5, further comprising struts on which said supporting bridge is mounted for displacement in a direction parallel to the axis of said cylinder means.

7. An injection unit as defined in claim 6, wherein each said strut passes through a separate one of said drive cylinders; said second hydraulic means further includes drive pistons, each affixed to a respective strut; and each said drive piston is disposed in one of said drive cylinders for cooperation therewith.

* * * * *

UNITED STATES PATENT OFFICE
CERTIFICATE OF CORRECTION

Patent No. 3,806,294           Dated April 23rd, 1974

Inventor(s) Karl Hehl

It is certified that error appears in the above-identified patent and that said Letters Patent are hereby corrected as shown below:

In the heading of the patent, line 3, change "Lossburg/Wurt," to --Lossburg/Wurtt.,--; line 10, change "19611819" to --19618190--; line 12, change "Feb. 25" to --Apr. 25--. Column 1, lines 16 and 17, change "pretasticizing" to --preplasticizing--; line 27, change "conveyor" to --conveyer--; line 29, change "conveyor" to --conveyer--. Column 2, line 37, start new paragraph with "FIG. 2 is". Column 5, line 19, change "plsticizing" to --plasticizing--;line 34, change "plsticizing" to --plasticizing--. Column 6, line 18, change "conveyor" to --conveyer--; line 19, change the semicolon ";" to a comma --,--; line 59, change "23'. the" to --23'. The--. Column 8, line 38, change "conveyor" to --conveyer--.

Signed and sealed this 10th day of September 1974.

(SEAL)
Attest:

McCOY M. GIBSON, JR.           C. MARSHALL DANN
Attesting Officer              Commissioner of Patents